US008862756B2

United States Patent
Kocyan et al.

(10) Patent No.: US 8,862,756 B2
(45) Date of Patent: *Oct. 14, 2014

(54) APPARATUS, SYSTEM, AND METHOD FOR FACILITATING DATA FLOW BETWEEN A FIRST APPLICATION PROGRAMMING INTERFACE AND A SECOND APPLICATION PROGRAMMING INTERFACE

(76) Inventors: Robert Kocyan, Malvern, PA (US); Richard Marko, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,054

(22) Filed: May 3, 2012

(65) Prior Publication Data

US 2012/0221620 A1    Aug. 30, 2012

Related U.S. Application Data

(63) Continuation of application No. 12/371,502, filed on Feb. 13, 2009, now Pat. No. 8,200,742.

(60) Provisional application No. 61/065,683, filed on Feb. 13, 2008.

(51) Int. Cl.
   *G06F 15/16*    (2006.01)
   *G06F 9/54*    (2006.01)

(52) U.S. Cl.
   CPC ............... *G06F 9/547* (2013.01); *G06F 9/541* (2013.01)
   USPC ........................................................ 709/230

(58) Field of Classification Search
   CPC ........................... H01L 69/322; H01L 69/329
   USPC .................................................. 709/201, 230
   See application file for complete search history.

(56) References Cited

U.S. PATENT DOCUMENTS

| | | | |
|---|---|---|---|
| 6,957,423 B1 * | 10/2005 | Ma ................................ | 717/137 |
| 2004/0013250 A1 * | 1/2004 | Kotnur et al. ............ | 379/112.01 |
| 2004/0083465 A1 * | 4/2004 | Zhang et al. .................. | 717/143 |
| 2004/0226027 A1 | 11/2004 | Winter .......................... | 719/328 |
| 2006/0004768 A1 | 1/2006 | Betts et al. ...................... | 707/10 |
| 2006/0143340 A1 | 6/2006 | Labar .............................. | 710/62 |
| 2006/0173931 A1 | 8/2006 | Broadhurst ................... | 707/204 |
| 2006/0200565 A1 | 9/2006 | Ng ................................ | 709/227 |
| 2007/0283331 A1 * | 12/2007 | Pietrek .......................... | 717/130 |
| 2008/0184063 A1 | 7/2008 | Abdulvahid ..................... | 714/6 |

OTHER PUBLICATIONS

Office Action Received from USPTO for U.S. Appl. No. 12/371,502. Nov. 14, 2011.

* cited by examiner

*Primary Examiner* — Jason Recek
(74) *Attorney, Agent, or Firm* — Kunzler Law Group

(57) ABSTRACT

An apparatus, system, and method are disclosed for facilitating data flow between a first application programming interface ("API") and a second API. The function receiving module receives a first function call from a calling application. The first function call is directed at one or more files comprising an API signature according to the first API. The function converting module converts the first function call according to the first API into a second function call according to a second API. The sending module sends the second function call to a processing application. The result receiving module receives a first data result from the processing application according to the second API. The result converting module converts the first data result according to the second API to a second data result according to the first API. The returning module returns the second data result to the calling application.

16 Claims, 5 Drawing Sheets

APPARATUS, SYSTEM, AND METHOD FOR FACILITATING DATA FLOW BETWEEN A FIRST APPLICATION PROGRAMMING INTERFACE AND A SECOND APPLICATION PROGRAMMING INTERFACE

CROSS-REFERENCES TO RELATED APPLICATIONS

This is a continuation application of and claims priority to patent application Ser. No. 12/371,502 filed Feb. 13, 2009, entitled "APPARATUS, SYSTEM AND METHOD FOR FACILITATING DATA FLOW BETWEEN A FIRST APPLICATION PROGRAMMING INTERFACE AND A SECOND APPLICATION PROGRAMMING," for Robert Kocyan, et al., which claims the benefit of U.S. Provisional Application No. 61/065,683, filed Feb. 13, 2008, which are both incorporated herein by reference.

BACKGROUND

1. Field of the Invention

This invention relates to facilitating data flow and more particularly relates to facilitating data flow between a first Application Programming Interface ("API") and a second API.

2. Description of the Related Art

Many companies continue to use legacy software due to the challenges involved with upgrading to newer versions of the software. Often, although the newer version of the software offers more desired features, many companies may not be able to financially or time-wise afford any required integration development work, or are unable to implement the new software due to the enormous task of updating any existing dependent information systems. Therefore, the cost of implementing new software often outweighs the benefits that the new software provides.

SUMMARY

From the foregoing discussion, it should be apparent that a need exists for an apparatus, system, and method that allow a company to use its existing information system with newer versions of software. Beneficially, such an apparatus, system, and method would facilitate data flow between an API of an older or legacy software and a second API for a newer version of the software.

The present invention has been developed in response to the present state of the art, and in particular, in response to the problems and needs in the art that have not yet been fully solved by currently available APIs. Accordingly, the present invention has been developed to provide an apparatus, system, and method for facilitating data flow between a first API and a second API that overcome many or all of the above-discussed shortcomings in the art.

The apparatus to facilitating data flow between a first API and a second API is provided with a plurality of modules configured to functionally execute the necessary steps of receives a first function call, converting the first function call into a second function call, sending the second function call, receiving a first data result, converting a first data result into a second data result, and returning the second data result. These modules in the described embodiments include a function receiving module, a function converting module, a sending module, a result receiving module, a result converting module, and a returning module. Furthermore, the apparatus may also include a logging module and an interfacing module.

In one embodiment, the function receiving module receives a first function call from a calling application sending and receiving data according to a first API. The first function call is directed at one or more files comprising an API signature according to the first API. The function converting module converts the first function call according to the first API into a second function call according to a second API. The sending module sends the second function call to a processing application according to the second API. The processing application sends and receives data according to the second API. The result receiving module receives a first data result from the processing application according to the second API. The result converting module converts the first data result according to the second API to a second data result according to the first API. The returning module returns the second data result to the calling application according to the first API.

In one embodiment, the function converting module further converts the first function call according to the first API to the second function call according to the second API by transferring one or more data values from the first function call to Extensible Markup Language ("XML") format and initializing a web services request. In another embodiment, the function converting module further converts the first function call according to the first API to the second function call according to the second API by mapping the first function call to the second function call.

In one embodiment, the interfacing module retrieves and processes additional data related to one or more data values of the first function call from external data sources. In one embodiment, the logging module logs a plurality of function calls between the calling application and the processing application.

In certain embodiments, the second API comprises an O Series API from Vertex, Inc. In one embodiment, the first API comprises a Q Series API from Vertex, Inc. In another embodiment, the first API comprises an L Series API from Vertex, Inc.

A computer program product comprising a computer readable storage medium having computer usable program code executable to perform operations for the present invention is also presented. The operations in the disclosed embodiments substantially include the steps necessary to carry out the functions presented above with respect to the operation of the described apparatus. In one embodiment, the method includes receiving a first function call from a calling application sending and receiving data according to a first API. The first function call is directed at one or more files comprising an API signature according to the first API. The method includes converting the first function call according to the first API into a second function call according to a second API. The method also includes sending the second function call to a processing application according to the second API, the processing application sending and receiving data according to the second API. The method includes receiving a first data result from the processing application according to the second API. Furthermore, the method includes converting a first data result according to the second API to a second data result according to the first API. The method also includes returning the second data result to the calling application according to the first API.

In one embodiment, converting the first data result according to the second API to the second data result according to the first API further comprises transferring one or more data values from XML format to data structures according to the first API. In another embodiment, converting the first data result according to the second API to the second data result according to the first API further comprises mapping data structures within the first data result to data structures within the second data result. The method may also include interfacing with an external database to obtain additional data related to one or more data values of the first function call. In one embodiment, the method includes logging a plurality of function calls between the calling application and the processing application.

A system of the present invention is also presented for facilitating data flow between a Vertex legacy series API and a Vertex O Series API. The system may be embodied as a client comprising a financial calling application, a server comprising a Vertex O Series processing application, and an interface translator in communication with the client and the server. In particular, the system, in one embodiment, includes similar modules to the apparatus described above.

In one embodiment, the function receiving module receives a first function call from the financial calling application. The first function call is directed at one or more files comprising an API signature according to the Vertex legacy series API. The function converting module converts the first function call according to the Vertex legacy series API into a second function call according to a Vertex O Series API. The sending module sends the second function call to a Vertex O Series processing application according to the Vertex O Series API. The result receiving module receives a first data result from the Vertex O Series processing application according to the Vertex O Series API. The result converting module converts the first data result according to the Vertex O Series API to a second data result according to the Vertex legacy series API. The returning module returns the second data result to the financial calling application according to the Vertex legacy series API.

In one embodiment, the function converting module further converts the first function call according to the Vertex legacy series API to the second function call according to the Vertex O Series API by transferring one or more data values from the first function call to XML format and initializing a web services request. In another embodiment, the function converting module further converts the first function call according to the Vertex legacy series API to the second function call according to the Vertex O Series API by mapping the first function call to the second function call. The interfacing module may interface with an external database to obtain additional data related to one or more data values of the first function call.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
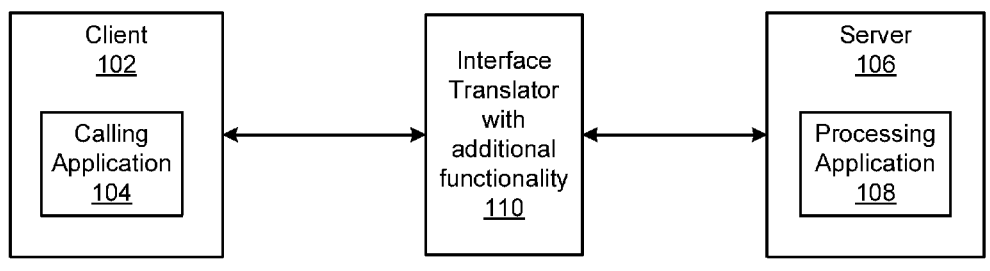
FIG. 1A is a schematic block diagram illustrating one embodiment of a system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1A depicts one embodiment of a system 100 to facilitate data flow between a first API and a second API in accordance with the present invention. The system 100 includes a client 102 comprising a calling application 104, a server 106 comprising a processing application 108, and an interface translator 110 in communication with the client 102 and the server 106.

The client 102 may be may be a personal computer, a laptop computer, a workstation, a computer system, an appliance, an application-specific integrated circuit ("ASIC"), a Personal Digital Assistant ("PDA"), a server, a server blade center, a server farm, a router, a switch, an appliance, or the like. One of skill in the art will recognize other examples of electronic devices that may serve as the client 102. Furthermore, the client 102 may comprise a processor and a memory.

The client 102 may operate a calling application 104. The calling application 104, in one embodiment, is a financial application using an API to interface with other applications to send and retrieve data. In one embodiment, the calling application 104 uses a legacy, or outdated API from Vertex, Inc. to invoke functions to retrieve tax information. As used herein, a legacy API refers to an API outdated by subsequent releases of versions of the API. In a preferred embodiment, the API is the Vertex, Inc. L Series (hereinafter "L Series") or Vertex, Inc. Q Series (hereinafter "Q Series") APIs for interfacing with the L Series tax application and the Q series tax application. The calling application 104 calls the functions associated with sales and use tax calculation in the Q Series shared libraries written in the C programming language.

The L Series API is much simpler than the Q Series API, consisting of a single function to calculate tax on a transaction. This function takes as a parameter a pointer to a sequential data structure or "link area" representing the transaction information needed for the tax calculation process. The L Series API is based on COBOL and RPG.

The server 106 may likewise be a personal computer, a laptop computer, a workstation, a computer system, an appliance, an ASIC, a PDA, a server, a server blade center, a server farm, a router, a switch, an appliance, or the like. One of skill in the art will recognize other examples of electronic devices that may serve as the server 106. Furthermore, the server 106 may comprise a processor and a memory and may be capable of operating the O Series tax application from Vertex, Inc. (hereinafter "O Series"). The O Series uses Java, Java-based web services, and XML and includes a corresponding API.

The interface translator 110 is in communication with the client 102 and the server 106 through such communication media as a network such as a LAN, a plurality of LANs, a localized intranet, a communication bus, or a direct cable connection such as a serial or parallel cable connection. In addition, the interface translator 110 may reside on the same computing device as the client 102. The interface translator 110 receives the invocation of specific functions within a Vertex legacy API like the Q Series API or the L series API. These functions are called by the calling application 104 and the interface translator 110 maps these invocations to intermediary functions that will invoke O Series web service methods and relay the results back to the calling application 104 via subsequent calls to the Vertex legacy API functions. In addition, the calling application 104 does not need to be modified. In one embodiment, the interface translator 110 includes shared files on the client 102 that comprise the same functional signature as the Vertex legacy files using an adapter pattern.

An adapter pattern, also known as a wrapper or wedge, is a software programming design principal which allows programs with normally incompatible interfaces to work together by wrapping an interface compatible with the calling program around the interface of the program being called.

The financial calling application 104 that is written to call C-language functions (for the Q series) in a shared library cannot invoke Java-based web service methods (for the O Series) without significant rewriting. The interface translator 110 allows the calling application 104 to utilize the O Series functionality as is, without modification to the calling application 104. Therefore, a company may benefit from the features and service of current software versions such as the O Series, without having to resort to expensive code rewrites of new system purchases. Furthermore, in some embodiments, the interface translator 110 includes additional functionality to receive and process relevant data from external data sources as will be described hereafter.

Figure 1B:
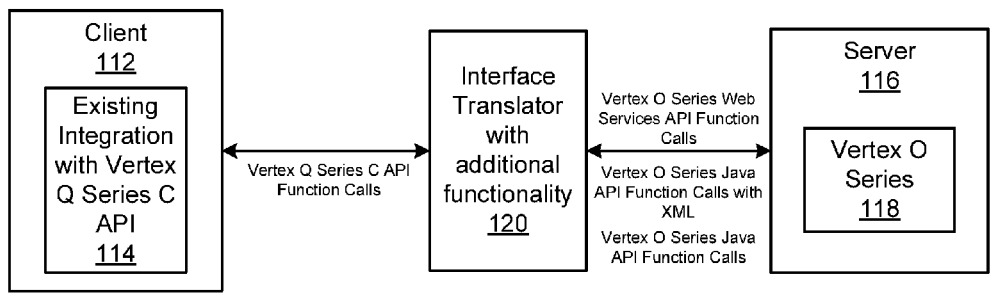
FIG. 1B is a schematic block diagram illustrating another embodiment of a system in accordance with the present invention.

FIG. 1B depicts another embodiment of a system 111 to facilitate data flow between a first API and a second API in accordance with the present invention. The system 111 includes a client 112 comprising a module with existing integration with Vertex Sales Tax Q Series C API 114, a server 116 comprising a Vertex Sales Tax O Series processing application 118, and an interface translator 120 in communication with the client 112 and the server 116. The client 112, server 116, and interface translator 120 may be substantially similar to the client 102, server 106, and interface translator 110 of FIG. 1A. Furthermore, the existing integration with Vertex Q Series C API 114 communicates with the interface translator 120 using Vertex Q Series C API function calls as will be described hereafter. In addition, the Vertex O Series 118 communicates with the interface translator 120 using Vertex O Series Web Services API function calls, Vertex O Series Java API functional call with XML, or Vertex O Series Java API functional calls.

Figure 1C:
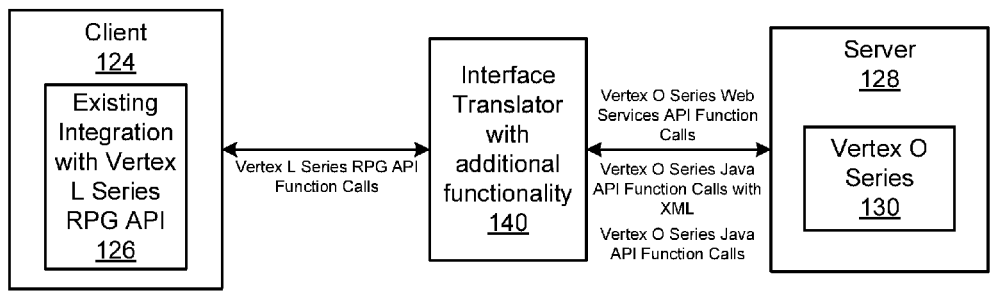
FIG. 1C is a schematic block diagram illustrating another embodiment of a system in accordance with the present invention.

FIG. 1C depicts another embodiment of a system 122 to facilitate data flow between a first API and a second API in accordance with the present invention. The system 122 includes a client 124 comprising a module with existing integration with Vertex Sales Tax L Series RPG API 126, a server 128 comprising a Vertex Sales Tax O Series processing application 130, and an interface translator 140 in communication with the client 124 and the server 128. The client 124, server 128, and interface translator 140 may be substantially similar to the client 102, server 106, and interface translator 110 of FIG. 1A. Furthermore, the module with existing integration with Vertex L Series RPG API 126 communicates with the interface translator 140 using Vertex L Series RPG API function calls as will be described hereafter. In addition, the Vertex O Series 130 communicates with the interface translator 140 using Vertex O Series Web Services API function calls, Vertex O Series Java API functional call with XML, or Vertex O Series Java API functional calls.

Figure 2:
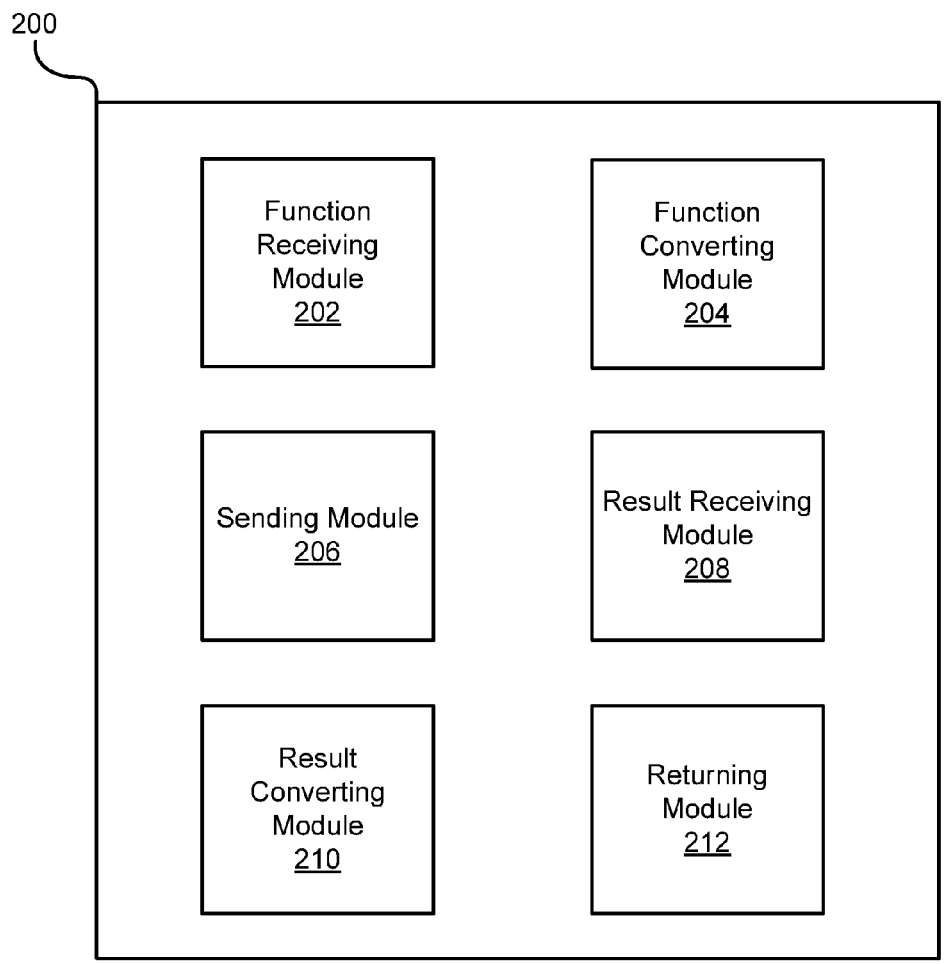
FIG. 2 is a schematic block diagram illustrating one embodiment of an apparatus to facilitate data flow between a first API and a second API in accordance with the present invention.

FIG. 2 depicts one embodiment of an apparatus to facilitate data flow between a first API and a second API in accordance with the present invention. The apparatus may include a function receiving module 202, a function converting module 204, a sending module 206, a result receiving module 208, a result converting module 210, and a returning module 212. Furthermore, the apparatus may comprise one embodiment of the interface translator 110.

The function receiving module 202 receives a first function call from the financial calling application 104 that sends and receives data according to a first API. The first API may be a Q Series API or an L Series API. The first function call may be directed at one or more files comprising an API signature according to the first API. Regarding the Q Series API, these files may be part of a platform-specific shared library that contains functions with the same function signature as the Q Series API functions. The replaced Q Series API functions fit into three general function families, consisting of Setter, Getter, and Action functions. The new Setter functions will call internal functions that will create and maintain data structures representing the transactional data passed to and from the Q Series API Setter and Getter functions.

The first function call may request tax data and may set variable for use in the calculation using Setter functions. In one embodiment, the first function call comprises a Setter function with the necessary variables and then the desired tax information request function. One example of such a function is the Q Series VstCalcTax function.

The function converting module 204 converts the first function call according to the first API into a second function call according to a second API. The second API may be the O Series API. The second function call is compatible with the second API. One example of the second function call is the CalculateTaxDoc web service method.

In one embodiment, the function converting module 204 transfers one or more data values from the first function call to XML format and initializes a web services request. The XML request messages passed to the O Series web service methods may be formatted based on the transaction information stored in the internal data structures in a manner that conforms to the XML request message structure prescribed in the XML schema definition ("XSD") files published by Vertex, Inc.

In another embodiment, the function converting module 204 maps the first function call to the second function call. For example, the function converting module 204 may directly map the methods of a C based class in the Q Series to methods of a Java based class in the O Series. The Q Series Action functions, which perform actions such as calculating tax on a transaction or looking up specific taxing jurisdictions, may be mapped to functions that invoke the O Series web methods that provide comparable functionality.

The sending module 206 sends the second function call to a processing application 108 according to the second API. The processing application 108 may be the O Series processing application 108. The sending module 206 may invoke the O Series web methods from the wrapper shared library using standard C-language POSIX TCP/IP socket library functions "send" and "recv", following the internet protocols covered in the IETF specification RFC 2616 (HTTP) and in the W3C Simple Object Access Protocol (SOAP) 1.0 specification.

The result receiving module 208 receives a first data result from the processing application 108 according to the second API after the processing application 108 has processed the variables. The first data result may include tax information at various levels along with jurisdictional information. In one embodiment, the result receiving module 208 stores the first data result.

The result converting module 210 converts the first data result according to the second API to a second data result according to the first API. In one embodiment, the result converting module 210 transfers one or more data values from XML format to data structures according to the first API. The XML response message sent from the O Series web service methods may be parsed and the relevant information will be stored in the internal data structures for use by the wrapper Getter functions that map to the Q Series API Getter functions.

In another embodiment, the result converting module 210 maps data structures within the first data result to data structures within the second data result. For example, regarding the L Series API, the XML response message sent back by the O Series web service method will be parsed and the relevant transaction tax information will be placed in the appropriate locations in the link area to be returned to the calling application 104.

The returning module 212 returns the second data result to the calling application 104 according to the first API. In one embodiment, the returning module 212 returns the second data result to the calling application 104 in response to the invocation by the calling application 104 of the appropriate Getter function.

Figure 3:
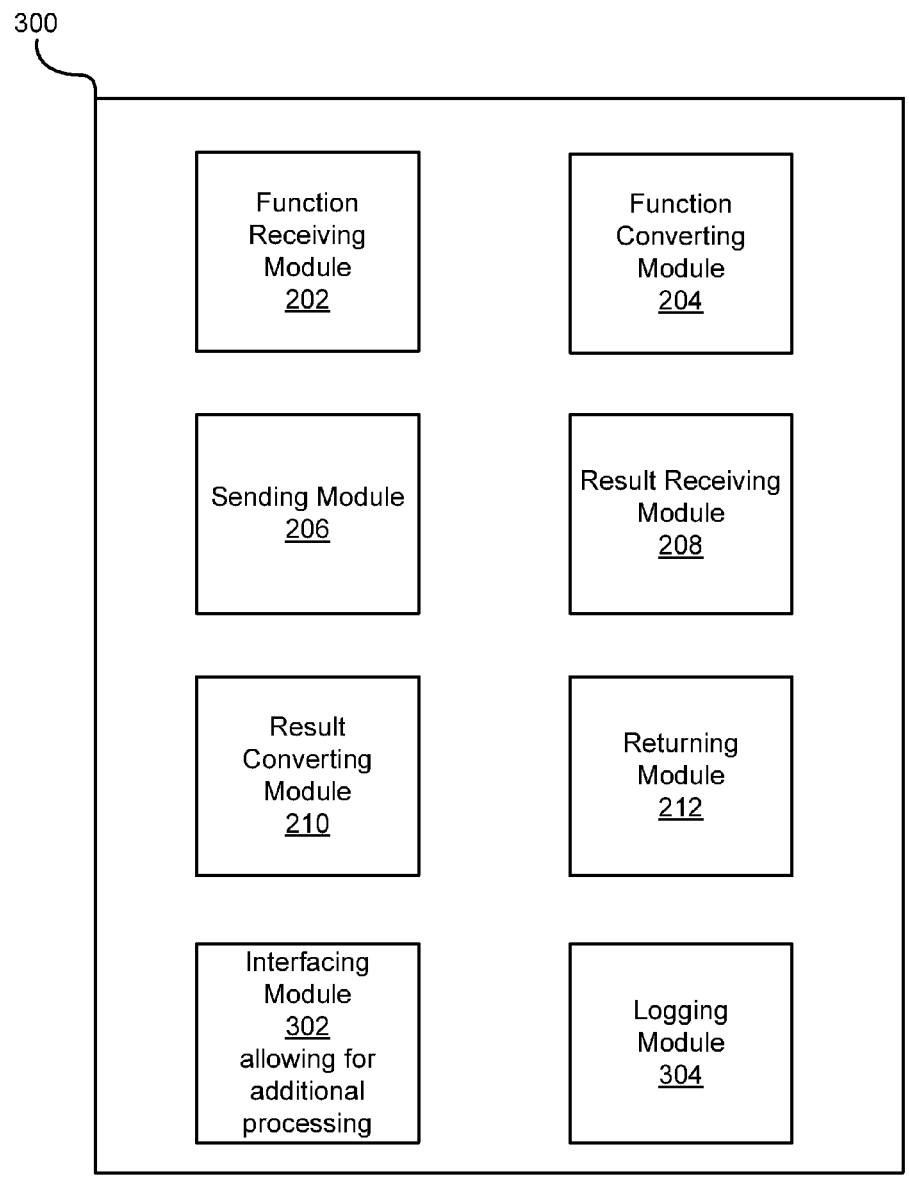
FIG. 3 is a detailed schematic block diagram illustrating another embodiment of an apparatus to facilitate data flow between a first API and a second API in accordance with the present invention.

FIG. 3 depicts another embodiment of an apparatus to facilitate data flow between a first API and a second API in accordance with the present invention. The apparatus may include the function receiving module 202, the function converting module 204, the sending module 206, the result receiving module 208, the result converting module 210, and the returning module 212. These modules may be substantially similar to the modules depicted in FIG. 2. Furthermore, the apparatus also includes an interfacing module 302 and a logging module 304.

The interfacing module 302 interfaces with external data sources to retrieve and process additional data related to one or more data values of the first function call. For example, the interface module may select a customer identification variable and reference an external database to retrieve a customer address. In this manner, the interfacing module 302 is not restricted to data obtained by the calling application 104. Furthermore, the interface module 302 may retrieve data when the interface translator 110 receives a function call from the calling application 104 or when the interface translator 110 receives a data result from the processing application 108.

The logging module 304 logs a plurality of function calls between the calling application 104 and the processing application 108. The logging module 304 may record function calls from the financial calling application 104. The logs may be useful for troubleshooting or auditing purposes.

Figure 4:
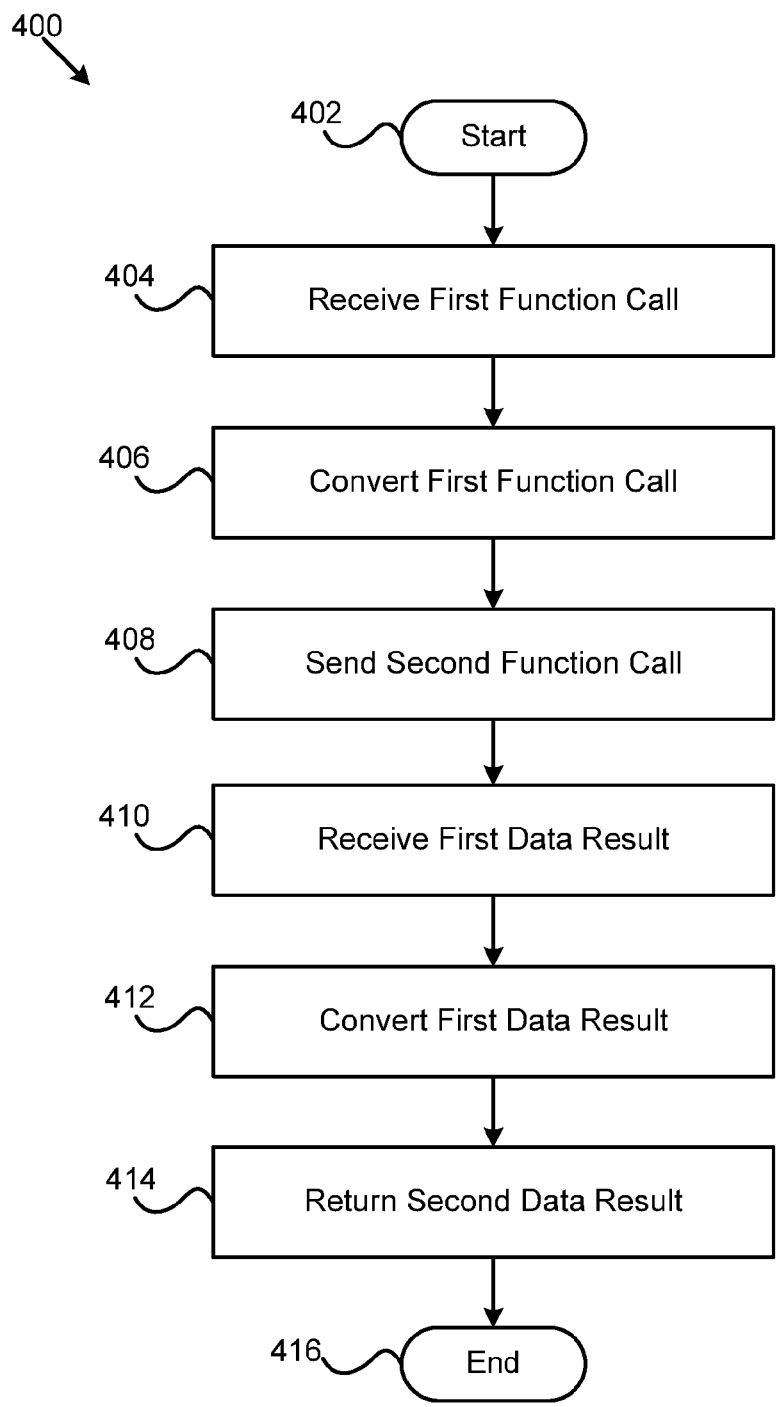
FIG. 4 is a schematic flow chart diagram illustrating one embodiment of a method for facilitating data flow between a first API and a second API in accordance with the present invention.

FIG. 4 depicts one embodiment of a method 400 for facilitating data flow between a first API and a second API in accordance with the present invention. The method 400 starts 402 when the function receiving module 202 receives 404 a first function call from a calling application 104. The first function call is directed at one or more files comprising an API signature according to the first API. Next, the function converting module 204 converts 406 the first function call according to the first API into a second function call according to a second API. The sending module 206 then sends 408 the second function call to a processing application 108 according to the second API, the processing application 108 sending and receiving data according to the second API. The result receiving module 208 receives 410 a first data result from the processing application 108 according to the second API. Next, the result converting module 210 converts 412 the first data result according to the second API to a second data result according to the first API. Finally, the returning module 212 returns 414 the second data result to the calling application 104 according to the first API and the method 400 ends 416.

Figure 5:
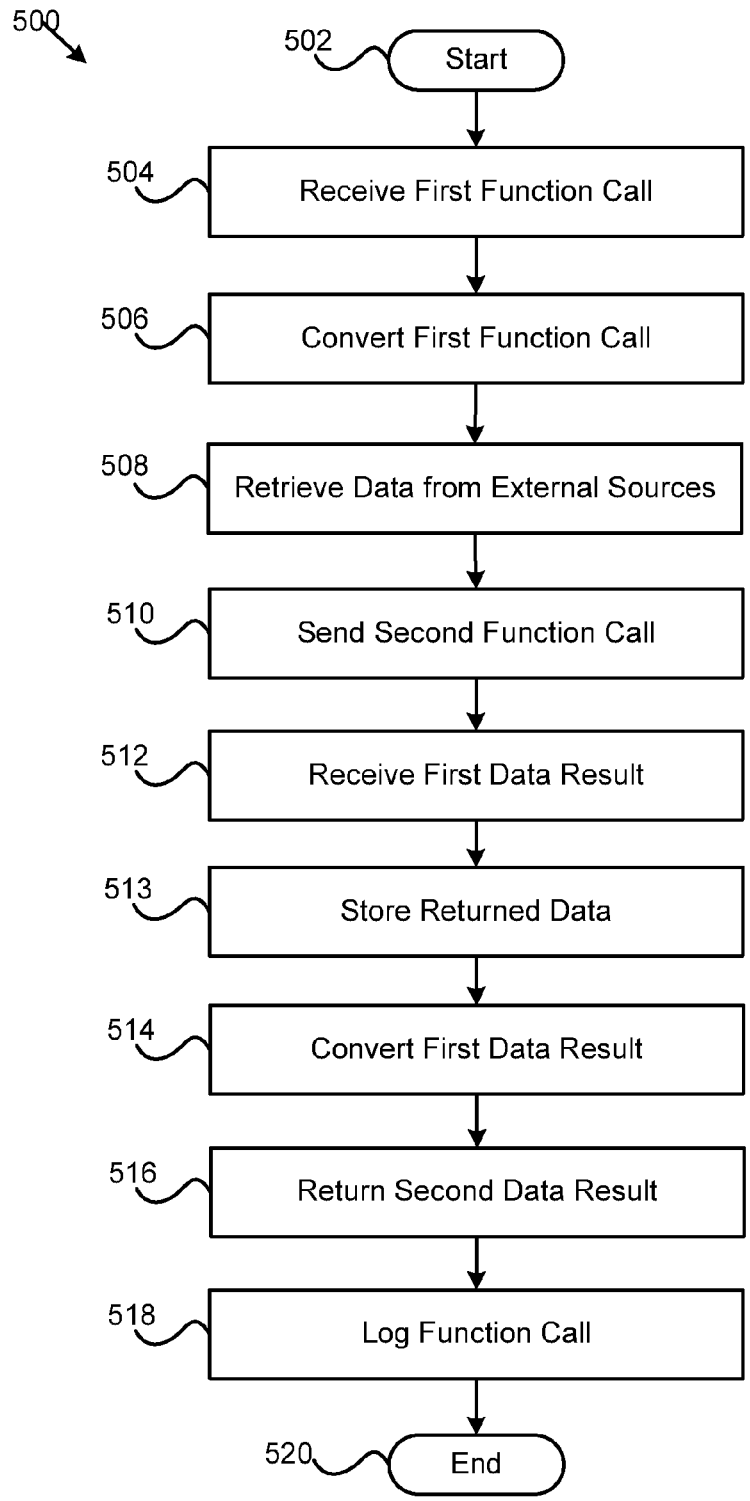
FIG. 5 is a schematic flow chart diagram illustrating one embodiment of a method for facilitating data flow between a first API and a second API in accordance with the present invention.

FIG. 5 depicts another embodiment of a method 500 for facilitating data flow between a first API and a second API in accordance with the present invention. The method 500 starts 502 when the function receiving module 202 receives 504 a first function call from a calling application 104. The first function call is directed at one or more files comprising an API signature according to the first API. Next, the function converting module 204 converts 506 the first function call according to the first API into a second function call according to a second API. The interfacing module 302 interfaces 508 with an external database to obtain additional data related to one or more data values of the first function call.

The sending module 206 then sends 510 the second function call to a processing application 108 according to the second API, the processing application 108 sending and receiving data according to the second API. The result receiving module 208 receives 512 a first data result from the processing application 108 according to the second API. The result receiving module 208 stores 513 the first data result from the processing application 108 according to the second API. Next, the result converting module 210 converts 514 the first data result according to the second API to a second data result according to the first API. Then, the returning module 212 returns 516 the second data result to the calling application 104 according to the first API. Finally, the logging module 304 logs 518 a plurality of function calls between the calling application 104 and the processing application 108 and the method 500 ends 520.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for facilitating data flow between a first Application Programming Interface ("API") and a second API, the apparatus comprising:
    a function receiving module that receives a first function call from a calling application sending and receiving data according to a first API, the first function call directed at one or more files comprising an API signature according to the first API, the one or more files comprising a function having a same function signature as a function signature of the first function call;
    an interfacing module that retrieves external data from a data source external to the calling application, the external data corresponding to one or more data values of the first function call;
    a function converting module that converts the first function call according to the first API into a second function call according to a second API, the external data being used with the second function call;
    a sending module that sends the second function call to a processing application according to the second API, the processing application sending and receiving data according to the second API;
    a result receiving module that receives a first data result from the processing application according to the second API;
    a result converting module that converts the first data result according to the second API to a second data result according to the first API; and
    a returning module that returns the second data result to the calling application according to the first API.

2. The apparatus of claim 1, wherein the function converting module further converts the first function call according to the first API to the second function call according to the second API by transferring one or more data values from the first function call to Extensible Markup Language ("XML") format and initializing a web services request.

3. The apparatus of claim 1, wherein the function converting module further converts the first function call according to the first API to the second function call according to the second API by mapping the first function call to the second function call.

4. The apparatus of claim 1, further comprising an interfacing module that retrieves and processes additional data related to one or more data values of the first function call from external data sources.

5. The apparatus of claim 1, further comprising a logging module that logs a plurality of function calls between the calling application and the processing application.

6. The apparatus of claim 1, wherein the second API comprises an O Series API from Vertex, Inc.

7. The apparatus of claim 6, wherein the first API comprises a Q Series API from Vertex, Inc.

8. The apparatus of claim 6, wherein the first API comprises an L Series API from Vertex, Inc.

9. A computer program product comprising a non-transitory computer readable storage medium having computer usable program code executable to perform operations for facilitating data flow between a first Application Programming Interface ("API") and a second API, the operations of the computer program product comprising:

- receiving a first function call from a calling application sending and receiving data according to a first API, the first function call directed at one or more files comprising an API signature according to the first API, the one or more files comprising a function having a same function signature as a function signature of the first function call;
- retrieving external data from a data source external to the calling application, the external data corresponding to one or more data values of the first function call;
- converting the first function call according to the first API into a second function call according to a second API, the external data being used with the second function call;
- sending the second function call to a processing application according to the second API, the processing application sending and receiving data according to the second API;
- receiving a first data result from the processing application according to the second API;
- converting the first data result according to the second API to a second data result according to the first API; and
- returning the second data result to the calling application according to the first API.

10. The computer program product of claim 9, wherein the converting the first data result according to the second API to the second data result according to the first API further comprises transferring one or more data values from Extensible Markup Language ("XML") format to data structures according to the first API.

11. The computer program product of claim 9, wherein the converting the first data result according to the second API to the second data result according to the first API further comprises mapping data structures within the first data result to data structures within the second data result.

12. The computer program product of claim 9, further comprising retrieving and processing additional data related to one or more data values of the first function call from external data sources.

13. The computer program product of claim 9, further comprising logging a plurality of function calls between the calling application and the processing application.

14. The computer program product of claim 9, wherein the second API comprises an O Series API from Vertex, Inc.

15. The computer program product of claim 14, wherein the first API comprises a Q Series API from Vertex, Inc.

16. The computer program product of claim 14, wherein the first API comprises an L Series API from Vertex, Inc.

* * * * *